United States Patent [19]
Chen

[11] Patent Number: 5,974,333
[45] Date of Patent: Oct. 26, 1999

[54] AUTOMOBILE ACOUSTIC UNIT HAVING INTEGRATED CELLULAR PHONE CAPABILITIES

[75] Inventor: Tonny Chen, Chang-Hwa, Taiwan

[73] Assignee: E-Lead Electronic Co., Ltd., Taiwan

[21] Appl. No.: 08/900,420

[22] Filed: Jul. 25, 1997

[51] Int. Cl.[6] .................................................. H04Q 7/32
[52] U.S. Cl. .......................... 455/569; 455/346; 455/351; 455/557
[58] Field of Search ..................................... 455/351, 345, 455/550, 556, 569, 347, 348, 349; 379/428, 93.11

[56] References Cited

U.S. PATENT DOCUMENTS

| | | | |
|---|---|---|---|
| 4,435,845 | 3/1984 | Timm et al. | 455/228 |
| 5,202,913 | 4/1993 | Lang et al. | 455/550 |
| 5,285,500 | 2/1994 | Mantz | 381/86 |
| 5,341,434 | 8/1994 | Kawamoto | 381/86 |
| 5,408,044 | 4/1995 | Spiegel | 174/52.1 |
| 5,418,836 | 5/1995 | Yazaki | 455/569 |
| 5,537,673 | 7/1996 | Nagashima et al. | 455/346 |
| 5,575,544 | 11/1996 | Hasegawa et al. | 321/7.1 |
| 5,627,891 | 5/1997 | Gallagher et al. | 379/455 |
| 5,797,088 | 8/1998 | Stamegna | 455/345 |

*Primary Examiner*—William G. Trost
*Assistant Examiner*—Sonny Trinh
*Attorney, Agent, or Firm*—Raymond Sun

[57] ABSTRACT

An automobile acoustic unit is provided for installation into an interior of an automobile. The automobile acoustic unit includes an audio source for generating audio signals, a chamber configured to receive and store a cellular phone, and a circuit for controlling and selecting the playback of audio signals from the audio source and signals from the cellular phone.

20 Claims, 13 Drawing Sheets

AUTOMOBILE ACOUSTIC UNIT HAVING INTEGRATED CELLULAR PHONE CAPABILITIES

BACKGROUND OF THE INVENTION

1. Field of the Invention

The present invention relates generally to an automobile acoustic unit, and in particular, to an automobile acoustic unit that allows a conventional cellular phone to be integrated therewith, and which allows for hands-free operation of the cellular phone.

2. Background Art

Figure 1:
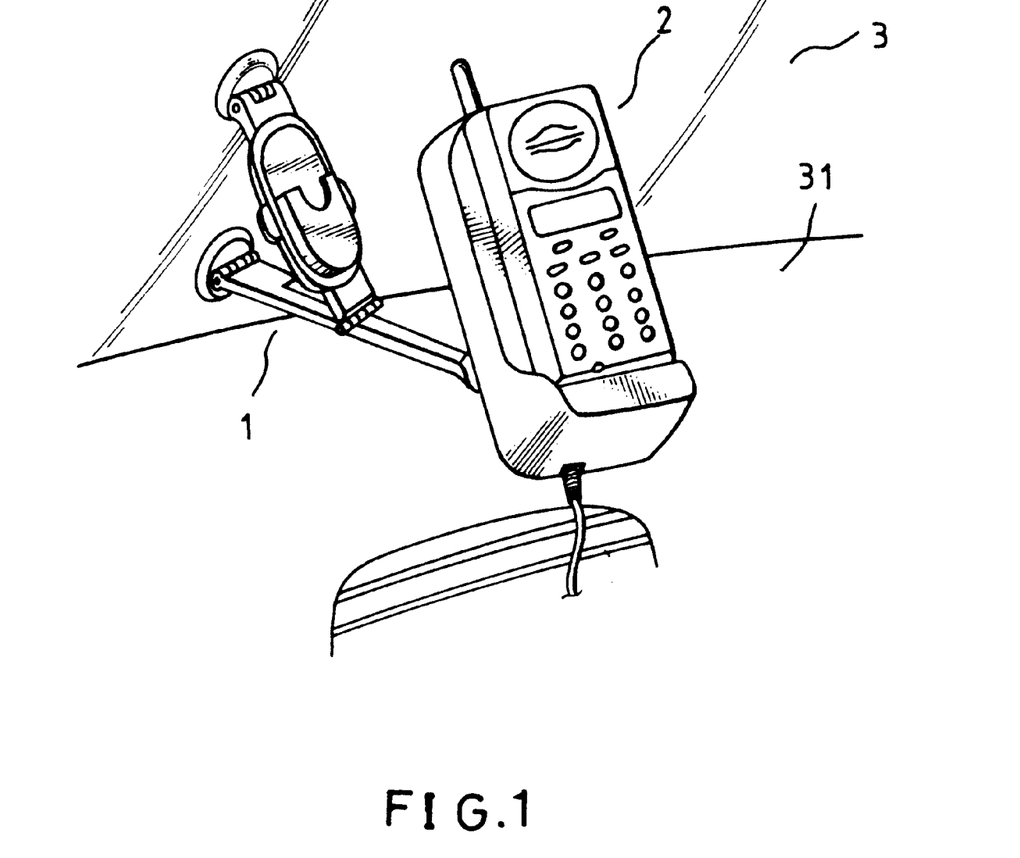
FIG. 1 is a perspective view illustrating one existing manner of installing a conventional cellular phone inside an automobile.
Figure 2:
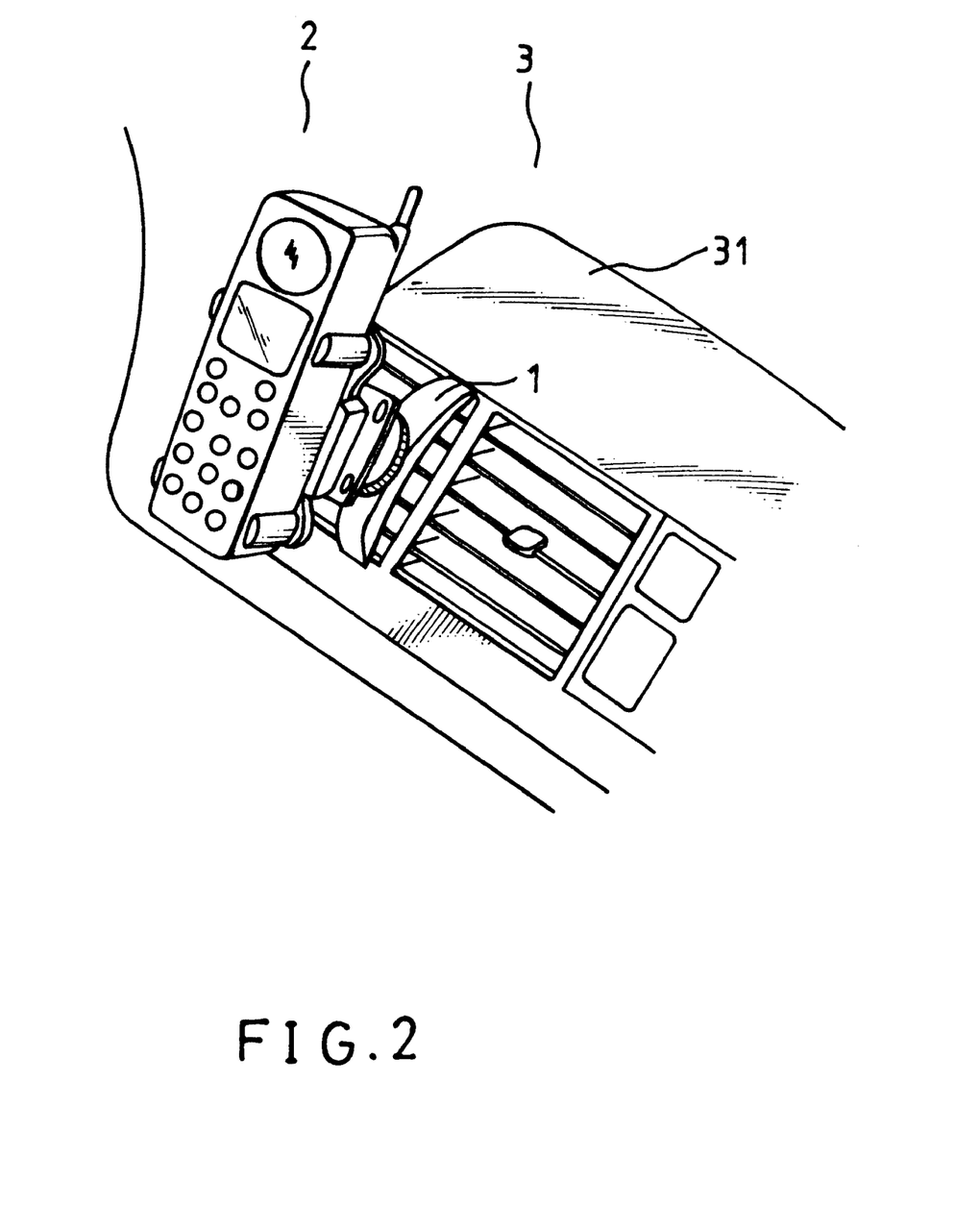
FIG. 2 is a perspective view illustrating another existing manner of installing a conventional cellular phone inside an automobile.

The use of automobile cellular phones has increased significantly. For the user's convenience and to enhance safety, many conventional automobile cellular phones have been installed in the automobile in a manner to provide hands-free operation and use. For example, in FIG. 1, a support frame 1 is used to support and stabilize the cellular phone 2 on the panel or dashboard 31 of an automobile body 3. Similarly, FIG. 2 illustrates the use of a support frame 1 to support and stabilize the cellular phone 2 adjacent an air-conditioning vent under the dashboard 31. Other cellular phones have been installed adjacent the gear box of the automobile.

Unfortunately, to provide hands-free operation for these conventional automobile cellular phones, additional communication equipment, such as cords and earphones, will have to be installed. These additional cords and earphones cause the interior of the automobile to appear clogged and unattractive. More importantly, the combination of the cellular phone and these additional cords hinder the driver's operation of the automobile. For example, if the cellular phone is installed adjacent an air-conditioning vent, the cold air exhaust may be blocked by the phone and the cords. If the cellular phone is installed adjacent the gear box, the phone and the cords may interfere with the driver's use of the gear stick.

Another drawback associated with the use of conventional automobile cellular phones is that these phones typically consume power from an internal power source within the automobile. The conventional automobile cellular phones are typically attached to a cigarette lighter or other separate power source. If the power source of the cigarette lighter is used, the cigarette lighter itself cannot be used by the driver. If a separate power source is to be installed, the original circuit design of the automobile's electronics must be altered, which can be very costly.

Yet another drawback associated with the use of conventional automobile cellular phones is that the sound quality is often unclear or very poor. One contributing factor is that the signals are often blocked or otherwise impaired by the body of the automobile, since many conventional cellular phones are usually provided with their own antennas that will be carried with the phone inside the automobile during use.

Thus, there remains a need to provide cellular phones for use in automobiles, which cellular phones are not only convenient to use, but which do not hinder or interfere with the driver while enhancing safety during use. There also remains a need for a cellular phone which will provide improved acoustics and sound quality, and improve the interior appearance of the automobile.

SUMMARY OF THE INVENTION

It is an object of the present invention to provide a hands-free cellular phone for use with an automobile which is convenient to use, does not hinder or interfere with the driver, and enhances safety during use.

It is another object of the present invention to provide a hands-free cellular phone for use with an automobile which offers improved acoustics, sound quality and performance.

It is yet another object of the present invention to provide a hands-free cellular phone for use with an automobile which enhances the appearance of the interior of the automobile, and which can be provided at low cost.

To accomplish the above objectives, the present invention provides an automobile acoustic unit that is installed into an interior of an automobile. The automobile acoustic unit includes an audio source for generating audio signals, a chamber configured to receive and store a cellular phone, and a circuit for controlling and selecting the playback of audio signals from the audio source and signals from the cellular phone.

In one embodiment of the present invention, the automobile acoustic unit includes a body having a front opening, with the chamber provided in the body and accessible through the front opening. A signal terminal is provided inside the chamber for coupling the cellular phone to the circuit. Springs may be provided in the chamber to securely retain the cellular phone in the chamber. The circuit includes an audio source switch for switching between the operations of the audio source and the cellular phone. In addition, a control panel may be coupled to the audio source switch to allow for hands-free control of the cellular phone. A socket for parallel connection to the signal terminal for on-line communication with a notebook computer via the cellular phone, and an earphone jack, may be provided on the control panel.

In another embodiment of the present invention, a hinged cover extends across the front opening. The hinged cover may be a front panel having control keys provided thereon.

In yet another embodiment of the present invention, a layer of protective material may be provided between the chamber and the cellular phone.

In yet a further embodiment of the present invention, an adapter case may be configured to be received and stored in the chamber and configured to receive a cellular phone which has a different size or configuration as the size or configuration of the chamber.

Further objects and advantages of the present invention will become apparent to those skilled in the art upon reading and understanding of the following detailed description and the accompanying drawings.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known data processing techniques, components, devices and circuits are omitted so as to not obscure the description of the present invention with unnecessary detail.

The present invention provides an automobile acoustic unit having a chamber that can receive and integrate a conventional cellular phone. The chamber receives and stores the cellular phone. The cellular phone is connected to the control circuit of the audio system of the automobile. In this manner, the audio system of the automobile is shared by both the cellular phone and the other audio functions (e.g., cassette, radio, CD), so that the sound transmission from the cellular phone can be amplified and output via the receiver system and the speakers of the audio system, thereby providing improved acoustics and sound quality.

Figure 3:
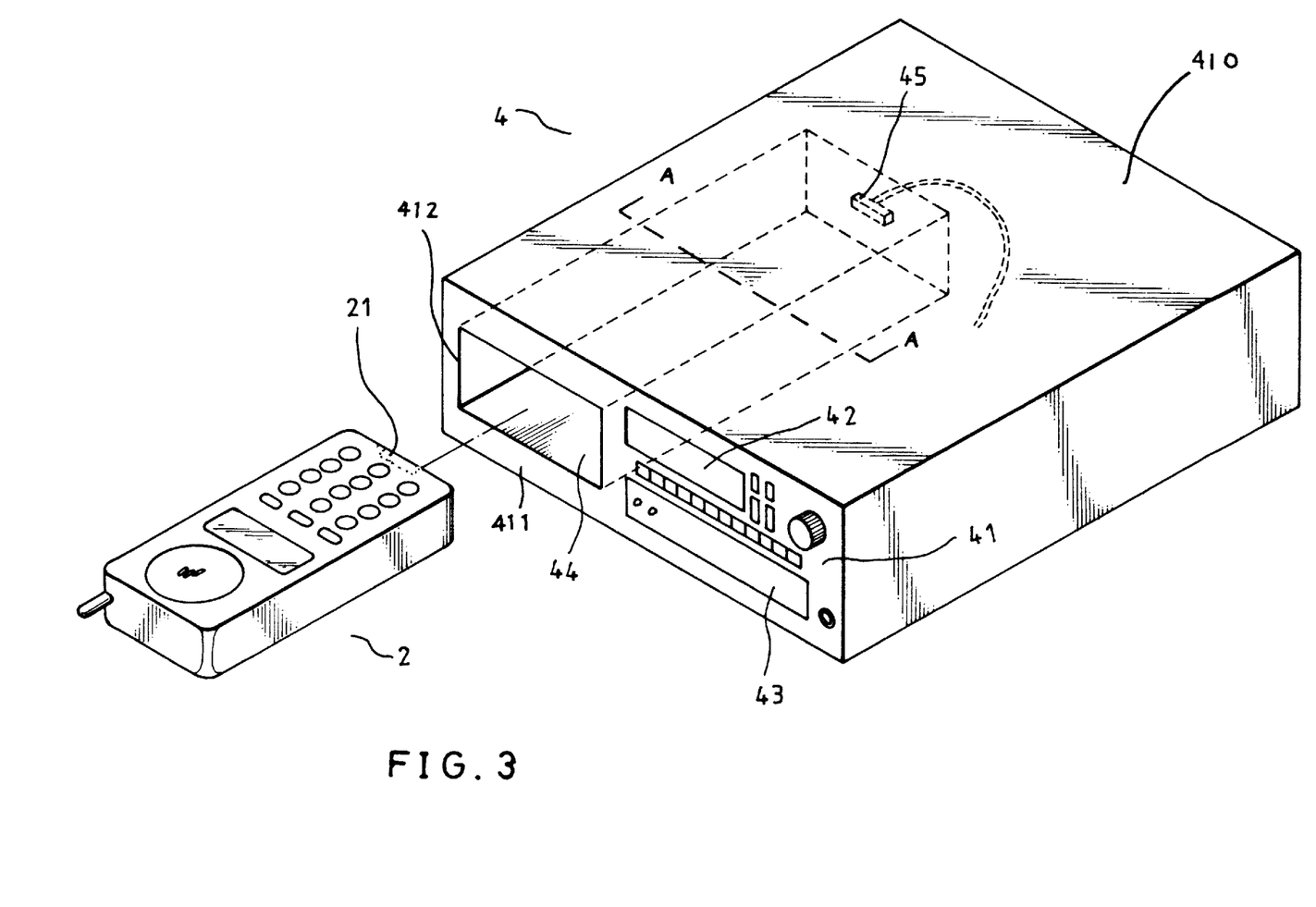
FIG. 3 is an exploded perspective view of a first embodiment of the automobile acoustics unit of the present invention shown in use with a cellular phone.

A first non-limiting embodiment of the present invention is illustrated in FIG. 3. An automobile acoustic unit 4 is provided with a body 410 which is adapted to be fitted and secured in a cut-out in the dashboard of an automobile. The acoustic unit 4 includes a plurality of general control press keys 41, a cassette or CD playback outlet 42 through which a cassette or CD may be inserted, a radio tuner, and a control panel 43, all provided on a front panel 411 of the body 410, and all of which are conventional components that can be found in conventional automobile acoustic units. The acoustic unit 4 further includes a chamber 44 having an opening 412 in the front panel 411. The chamber 44 is configured to receive a conventional cellular phone 2. The rear of the chamber 44 has a cellular phone signal terminal 45 which is connected to the control circuit (shown in FIG. 4) of the automobile acoustic unit 4. The cellular phone 2 can be slid into the chamber 44, and has a signal plug socket 21 for receiving the signal terminal 45.

Figure 4:
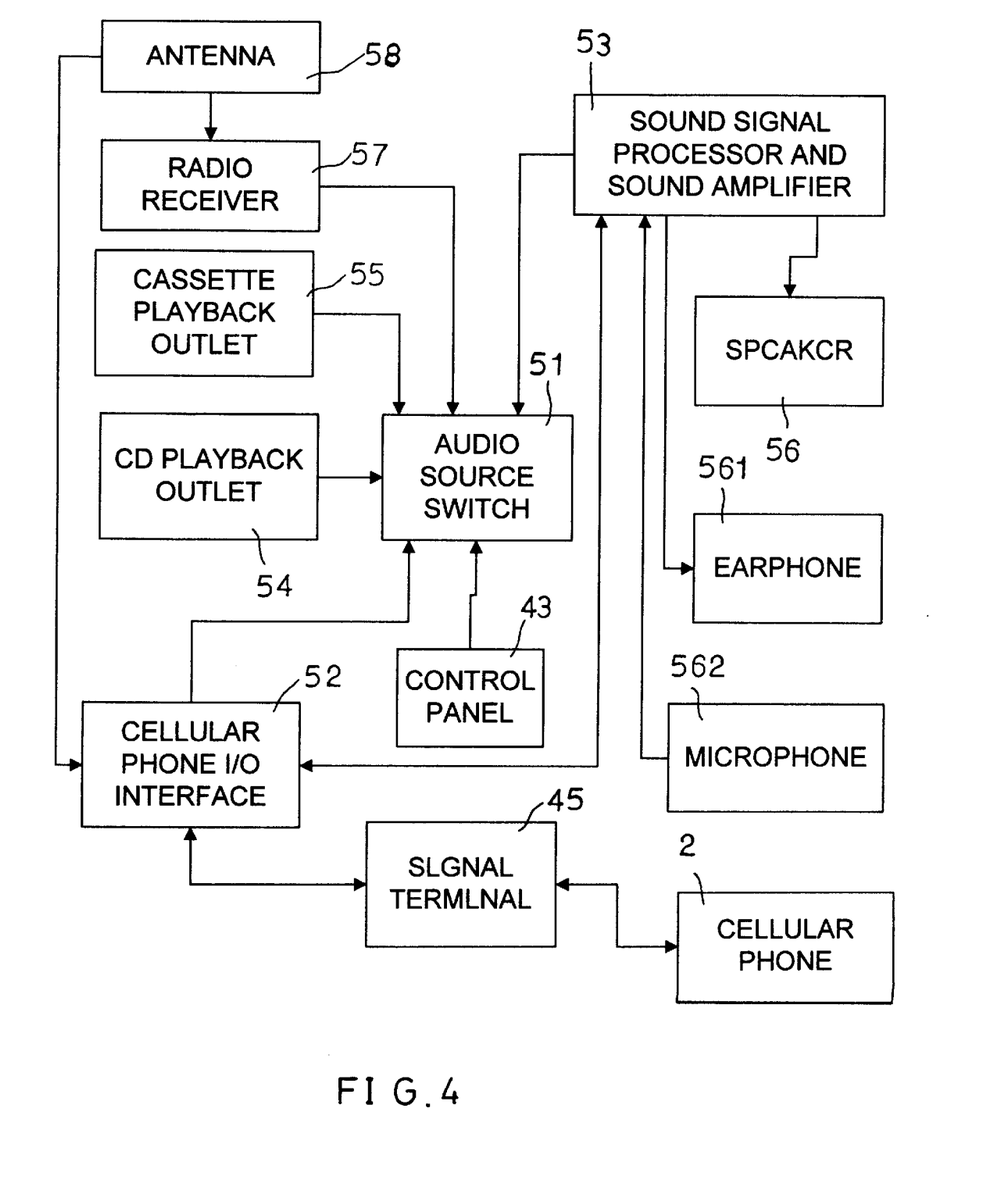
FIG. 4 is a schematic block diagram of the control circuit of the automobile acoustics unit of FIG. 3.

Referring now to FIG. 4, the control circuit 5 of the automobile acoustic unit 4 includes an audio source switch 51 which is coupled to a cellular phone I/O interface 52 and a sound signal processor and amplifier 53. A CD playback outlet 54, a cassette playback outlet 55, and a radio receiver 57 are coupled to transmit signals to the audio source switch 51. A conventional antenna 58 is coupled to the radio receiver 57 and the cellular phone I/O interface 52 to provide radio (i.e., audio) and incoming cellular phone signals to the control circuit 5. Speakers 56 and an earphone 561 may be connected to the signal processor and amplifier 53 for outputting sound signals. In addition, a microphone 562 and the cellular phone I/O interface 52 are connected to the signal processor and amplifier 53 to provide input signals thereto.

The audio source switch 51 is used to control the signal input source of the signal processor and amplifier 53. For example, the audio source switch 51 determines whether signals from the radio receiver 57, the cassette playback outlet 55, the CD playback outlet 54, or the cellular phone (via the signal terminal 45 and the cellular phone I/O interface 52 ) are directed to the signal processor and amplifier 53. The cellular phone I/O interface 52 functions to control the reception of the cellular phone's input signals from one of various dialing modes or sources, such as inputs using remote dialing mode, hand-writing board dialing, voice transfer input through voice dialing, press key dialing signal (i.e., input by operation panel), or computer on-line wiring. The signal processor and amplifier 53 provides input and output volume amplification and/or transfer processing. The control panel 43 is coupled to the audio source switch 51 and may be used as the key panel for the cellular phone 2, since the key panel of the cellular phone 2 will be covered and not accessible for use when the cellular phone 2 is stored inside the chamber 44.

The audio source switch 51 can be provided in the form of a conventional microprocessor acting as an analog switch. In addition, the cellular phone I/O interface 52 may also be provided in the form of a conventional microprocessor. Alternatively, a single microprocessor can be used to embody both the audio source switch 51 and the cellular phone I/O interface 52.

In use, the cellular phone 2 is fitted into the chamber 44, with the signal terminal 45 connected to the signal plug socket 21 to connect the cellular phone 2 to the control circuit 5 of the automobile acoustic unit 4. When the antenna 58 receives an incoming signal for the cellular phone 2 through the cellular phone I/O interface 52, the audio source switch 51 will stop any audio operation currently taking place (e.g., the CD, cassette or radio) and will change over to the output of the cellular phone's 2 incoming call alarm. The driver or user can then receive the incoming telephone call by using the applicable keys on the control panel 43 through a remote dial mode, a voice-operated dial mode, or a hand-writing board dial mode. The user or driver can conduct a conversation through the speaker system 56 of the automobile's audio system and the microphone 562 (without using an earphone 561), or through the earphone 561 and the microphone 562 (without using the speakers 56). At the end of the phone conversation, the audio source switch 51 can instruct the acoustic unit 4 to resume the audio operation that had previously been interrupted by the incoming call, or query the user for further instructions or control.

Figure 5:
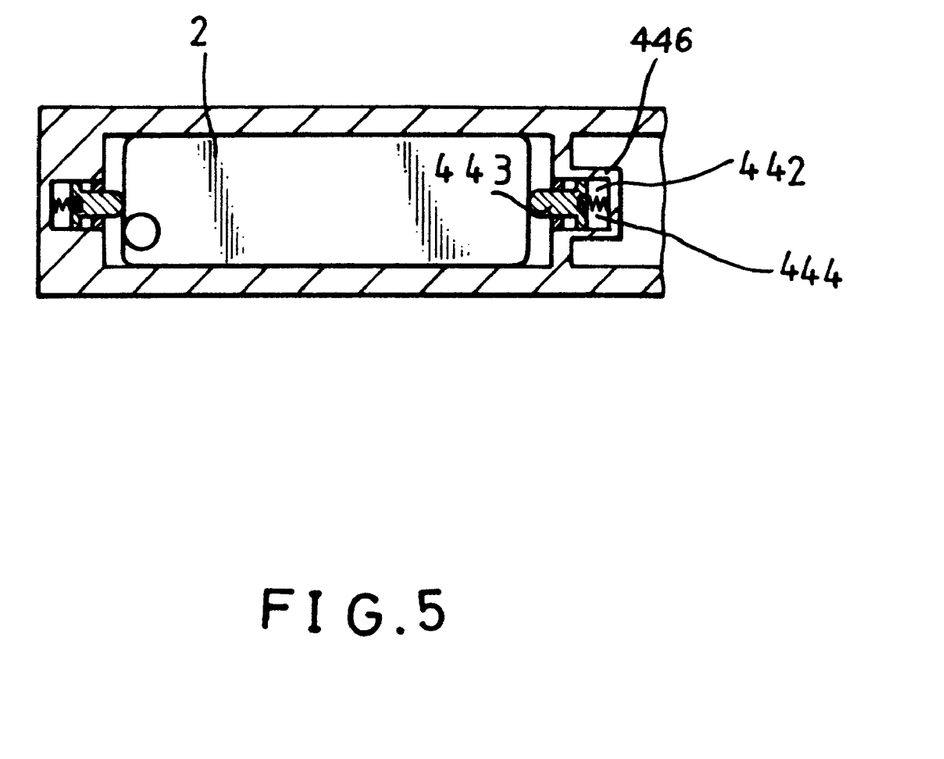
FIG. 5 is a cross-sectional view of the automobile acoustics unit of FIG. 3 taken along line A—A illustrating one method of securing the cellular phone in the automobile acoustic unit.

FIG. 5 illustrates one example of how the cellular phone 2 can be secured inside the chamber 44. A longitudinal groove 442 can be provided in each side wall 446 of the chamber 44. One or more cooperating bolts 443 and springs 444 are provided in the grooves 442. The springs 444 bias the corresponding bolts 443 outwardly against the body of the cellular phone 2 to stably secure the cellular phone 2 inside chamber 44. Of course, one end of the cellular phone 2 is attached to the acoustic unit 4 via the connection between the signal terminal 45 and the signal plug socket 21 (see FIGS. 3 and 6).

Figure 6:
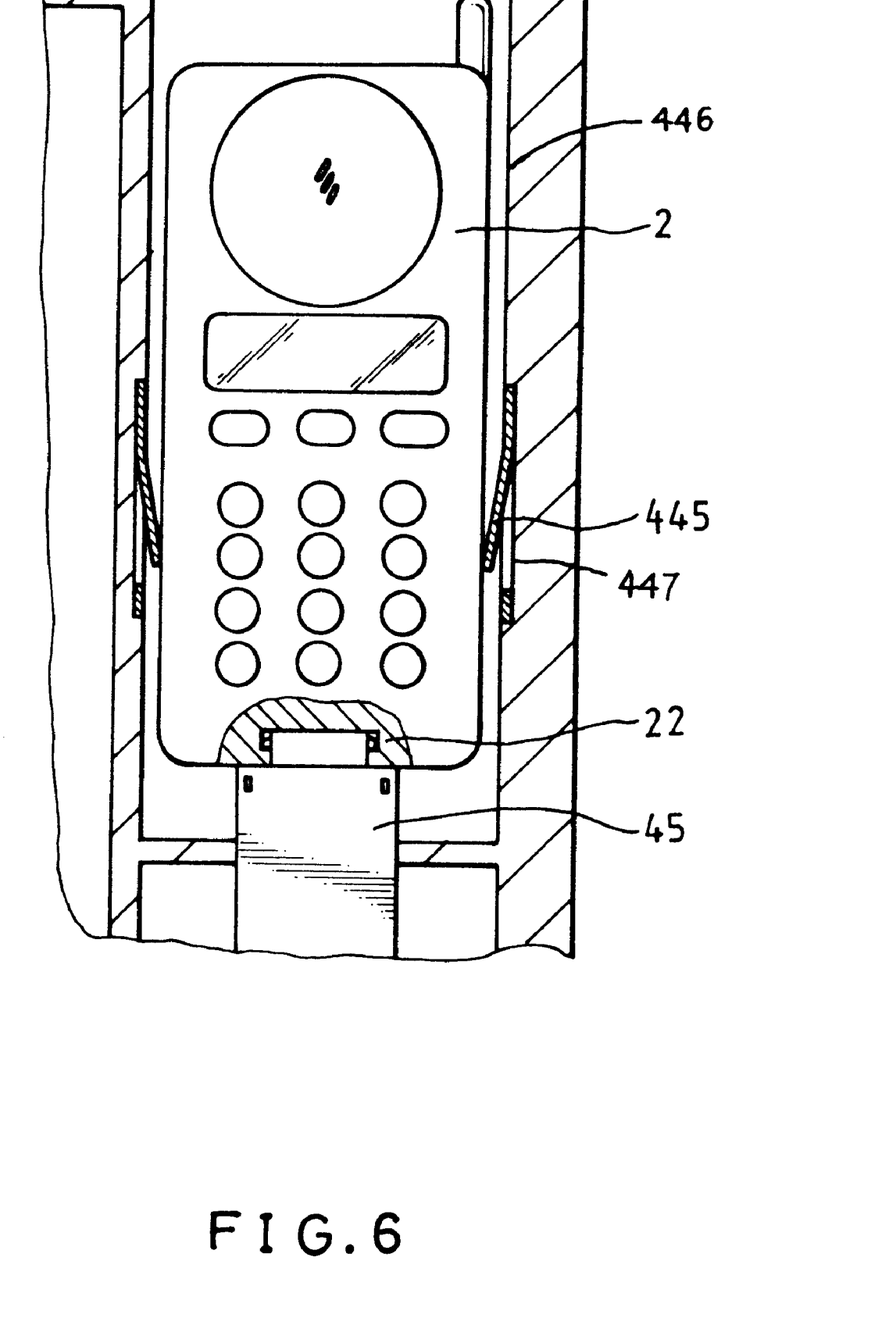
FIG. 6 is a top sectional view of the automobile acoustics unit of FIG. 3 illustrating another method of securing the cellular phone in the automobile acoustic unit.

FIG. 6 illustrates another example of how the cellular phone 2 can be secured inside the chamber 44. A spring 445 can be attached at one end to a slot or groove 447 provided on each side 446 of the chamber 44. The other end of the spring 445 is biased outwardly against the body of the cellular phone 2 to stably secure the cellular phone 2 inside chamber 44.

Figure 7:
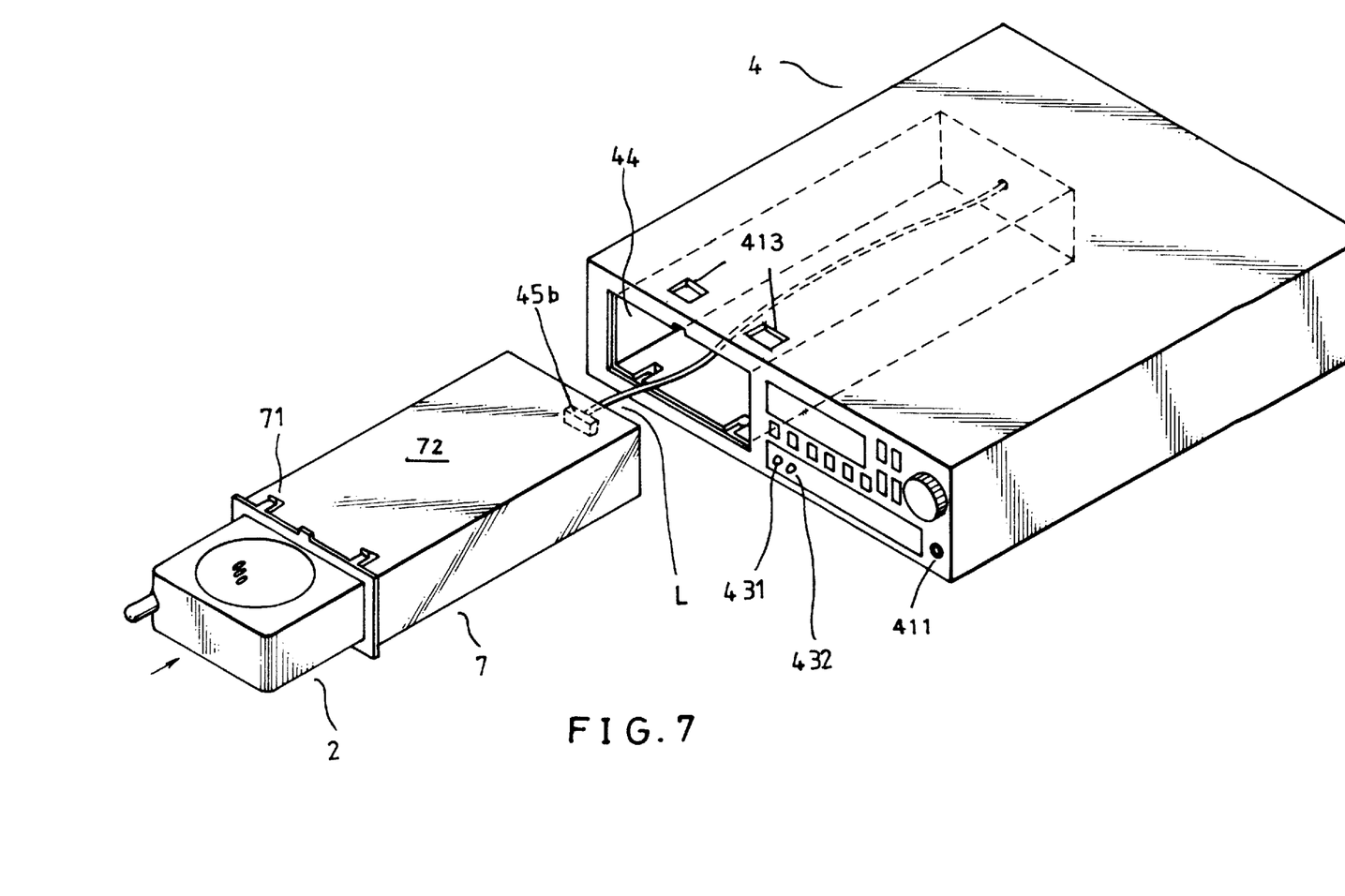
FIG. 7 is an exploded perspective view of a second embodiment of the automobile acoustics unit of the present invention shown in use with a cellular phone.

Since cellular phones 2 are now provided in a large variety of shapes and sizes, FIG. 7 illustrates a second embodiment of the present invention which provides an adapter case 7 acting as a placement seat for accomodating the different shapes and sizes of the cellular phones 2. Specifically, the chamber 44 can be provided in one particular shape and size, and different adapter cases 7 can be provided in customized fashion for each different cellular phone 2. The signal terminal 45b can be provided inside the adapter case 7 for connection to the signal plug socket 21 of the cellular phone 2 that is to be fitted inside the adapter case 7. A lead or cable L connects the signal terminal 45b to the control circuit 5. A spring hook 71 can be provided on a top surface 72 of the adapter case 7. Two openings 413 are provided in the acoustic unit 4 at the top of the chamber 44 to receive the spring hooks 71. The spring hooks 71 are pressed downwardly against the top surface 72 by the walls of the chamber 44 when the adapter case 7 is inserted into the chamber 44. When the adapter case 7 is inside the chamber 44, each spring 71 biases outwardly to cause its hooked-shaped end to catch against or engage a front edge of one of the openings 413 to securely hold the adapter case 7 inside the chamber 44. To remove the adapter case 7, the acoustic unit 4 is removed from the dashboard of the automobile, and the two spring hooks 71 are pressed downwardly again to release the the spring hooks 71 from the openings 413 so that the adapter case 7 can be removed. Thus, the acoustic unit 4 of the present invention can be used with virtually any model and make of cellular phones, making it practical and versatile.

To provide privacy during phone conversations, an earphone jack 431 (see FIG. 7) can be provided on the control panel 43. Therefore, an earphone (not shown) can be plugged into the jack 431 to cut off the sound to the speakers 56, while routing the sound to the earphones. Another possible feature is to include a parallel cellular phone signal terminal 432 (see FIG. 7) on the control panel 43 to bring a notebook or other portable computer on-line via the cellular phone 2.

Figure 8:
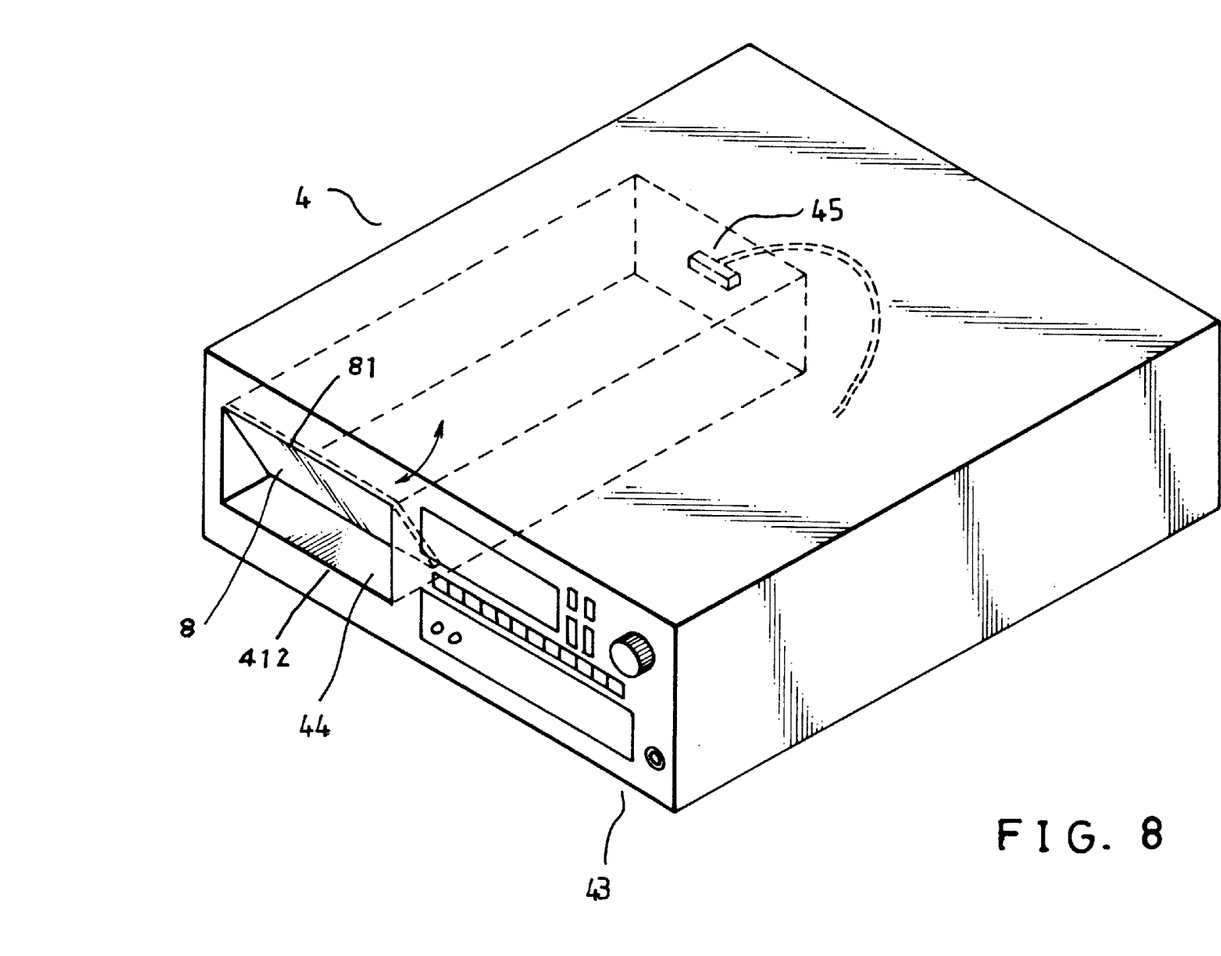
FIG. 8 is an exploded perspective view of the automobile acoustics unit of either FIG. 1 or FIG. 2 shown in use with a cover.

In addition, the aesthetic appearance of the acoustic unit 4 can be improved by providing a dust cap or lid 8, which can be fitted at the opening 412 of the chamber 44 (see FIG. 8). The dust cap 8 is hinged along an upper edge 81 of the opening 412, and biased to assume a generally vertical orientation to cover the opening 412. Before the cellular phone 2 is inserted into the chamber 44, the dust cap 8 will cover the opening 412. When the cellular phone 2 is inserted through the opening 412, the dust cap 8 is pushed inwardly about its hinge by the cellular phone 2, as shown in FIG. 8. The dust cap 8 covers the cellular phone 2 after it has been secured inside the chamber 44. To remove the cellular phone 2, the user pushes the dust cap 8 upwardly and reaches into the chamber 44 to pull out the cellular phone 2.

Figure 9:
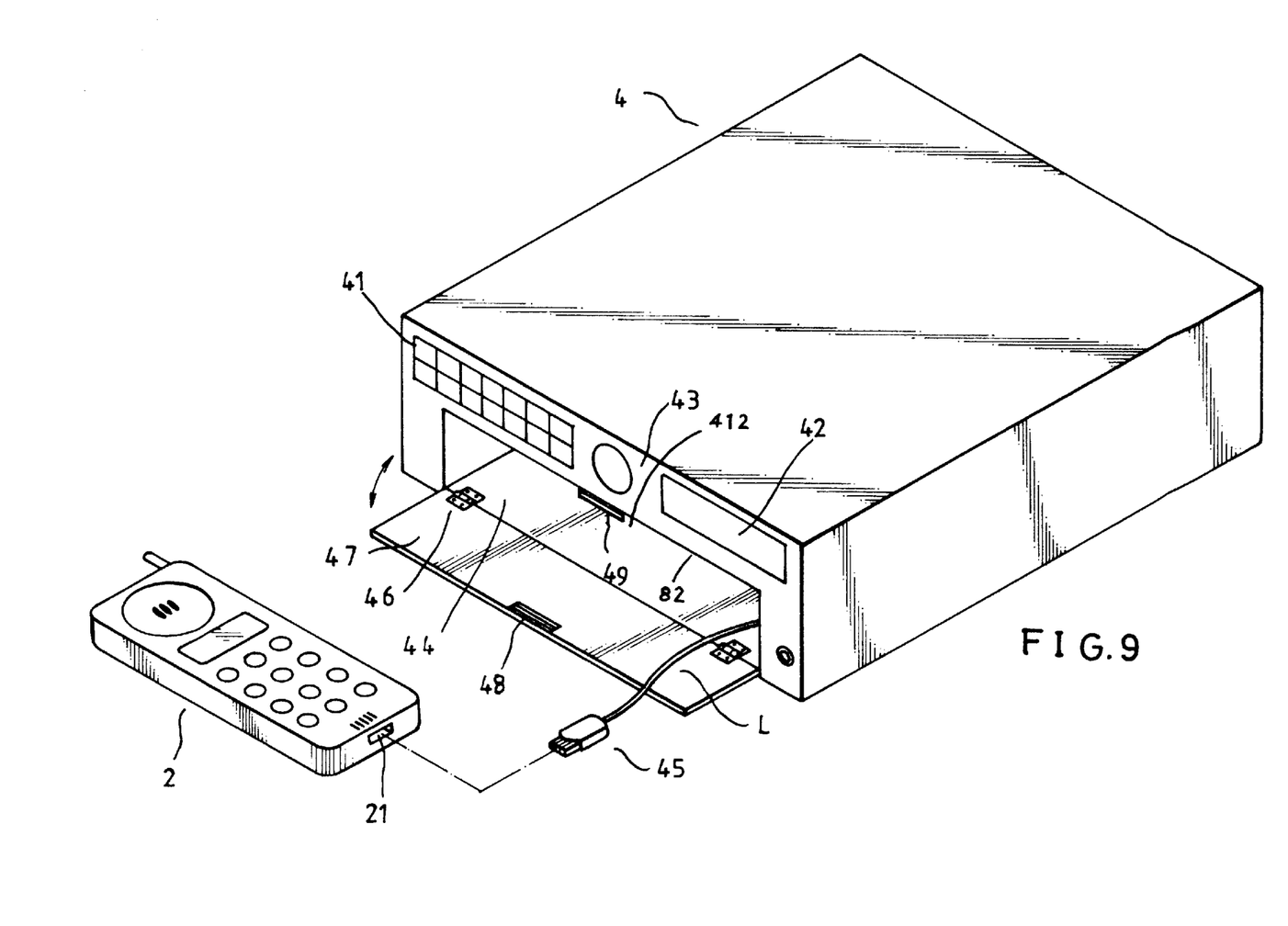
FIG. 9 is an exploded perspective view of a third embodiment of the automobile acoustics unit of the present invention shown in use with a cellular phone.

FIG. 9 illustrates another non-limiting embodiment of the present invention, in which like numerals correspond to like elements in FIG. 3. In this embodiment, the opening 412 is provided with a cover 47 which is connected to the acoustic unit 4 by a pair of hinges 46. A fastener 48 is provided on an internal surface of the cover 47 and is adapted to engage a corresponding fastener 49 provided along an upper edge 82 of the opening 412. Such fasteners 48, 49 are therefore concealed from external view, and can be provided in the form of cooperating magnets, male-female connectors, cooperating hooks and latches, Velcro™ and other conventional fasteners. Inside the chamber 44, the signal terminal 45 is connected by a cable or lead L to the control circuit 5. The lead L is provided in a certain length that is long enough to allow the signal terminal 45 to extend outside the chamber 44 to facilitate ease of connection with the signal plug socket 21 of the cellular phone 2.

Figure 10:
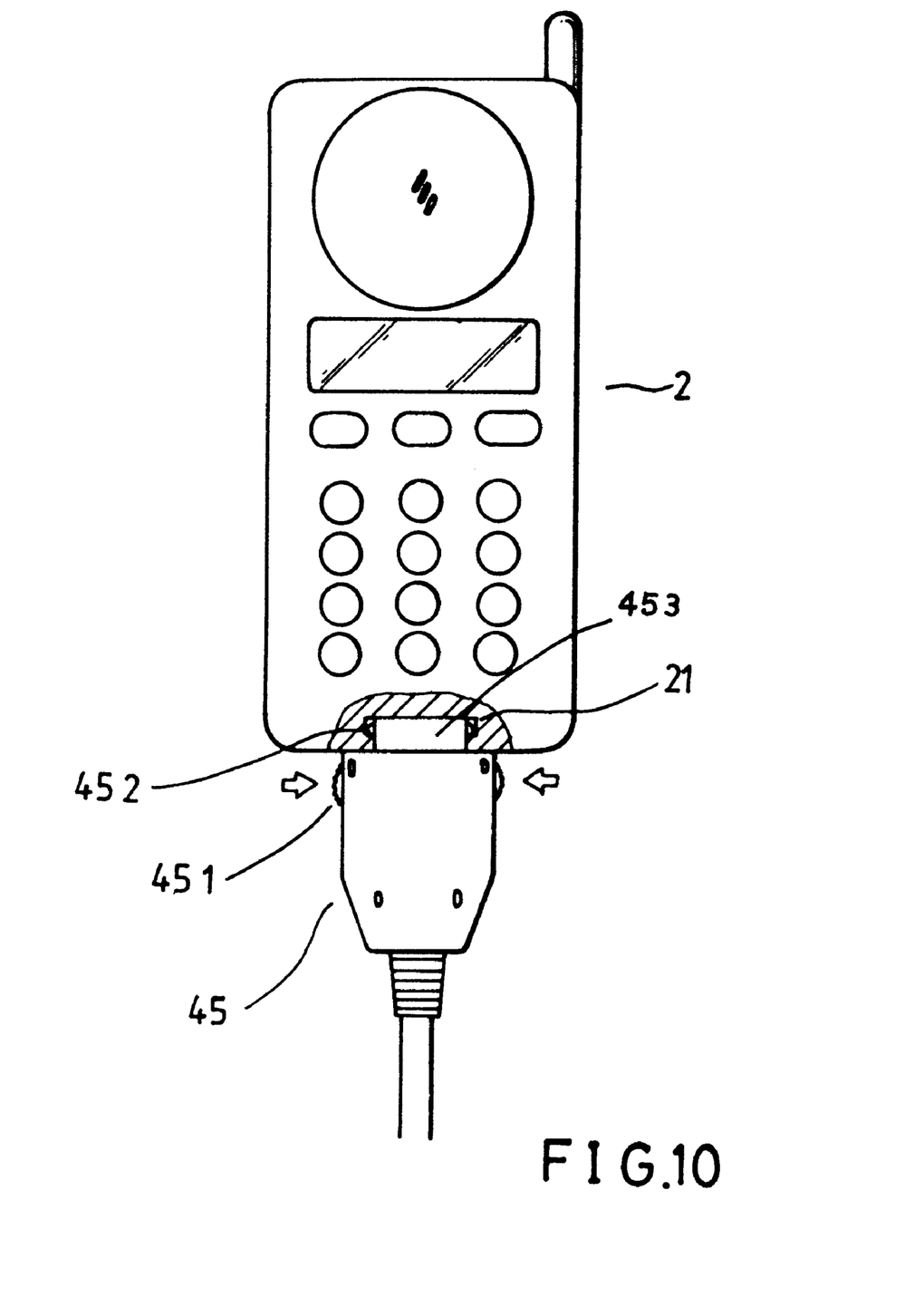
FIGS. 10 and 11 illustrate two embodiments of connections between the signal terminal of the automobile acoustics unit of FIG. 9 and the cellular phone.

In use, the signal terminal 45 can be pulled out of the chamber 44 and connected to the signal plug socket 21 of the cellular phone 2 in the manner shown in FIG. 10. Specifically, the signal terminal 45 has a pair of press buttons 451 on either side thereof which are used to control a pair of fastening buttons 452 provided on a recessed end portion 453 of the signal terminal 45. Pressing the press buttons 451 will cause the fastening buttons 452 to be retracted into the recessed end portion 453. At this point, the recessed end portion 453 can be inserted into the signal plug socket 21. The press buttons 451 are then released to cause the fastening buttons 452 to extend outwardly to secure the recessed end portion 453 inside the signal plug socket 21. The cellular phone 2, the signal terminal 45 and the lead L are then placed inside the chamber 44 and the cover 47 is secured over the opening 412. Thus, the cover 47 functions to protect the chamber 44 from dust and other particles, and to conceal the cellular phone 2 from plain view, thereby deterring theft.

Figure 11:
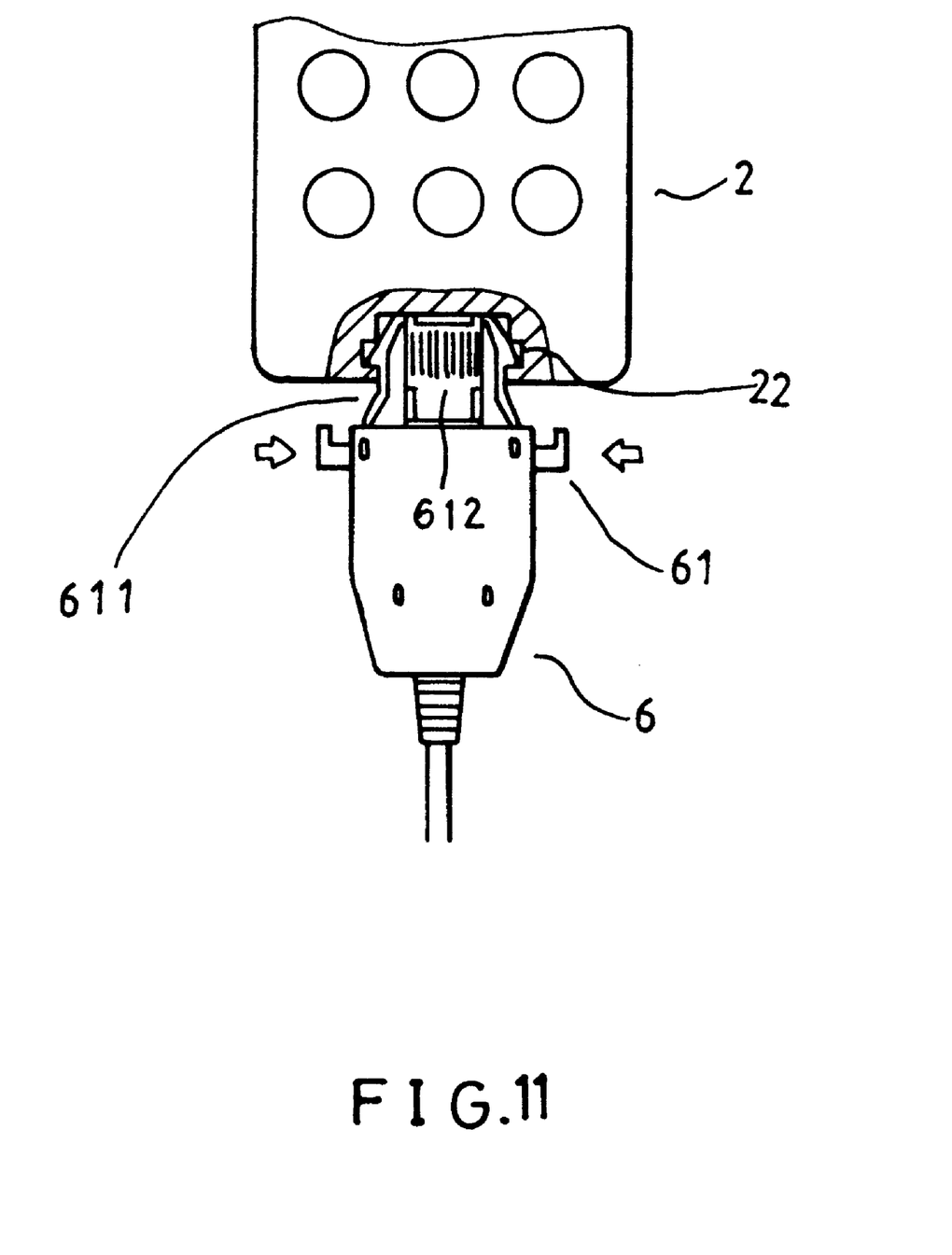

The signal terminal used in the chamber 44 of the present invention can also be configured so that it can be used with a number of different models of cellular phones 2 having different signal plug sockets. FIG. 11 illustrates a non-limiting example of such a signal terminal-signal plug socket connection, in which the signal plug socket is a plug-type socket 22 and the signal terminal is a plug-type terminal 6. A pair of press buttons 61 are provided on each side of the signal terminal 6 to control a corresponding pair of spring hooks 611. Pressing the press buttons 61 will cause the spring hooks 611 to retract. At this point, the recessed end portion 612 of the terminal 6 can be inserted into the signal plug socket 22. The press buttons 61 are then released to cause the spring hooks 611 to extend outwardly to secure the recessed end portion 612 inside the signal plug socket 22.

Figure 12:
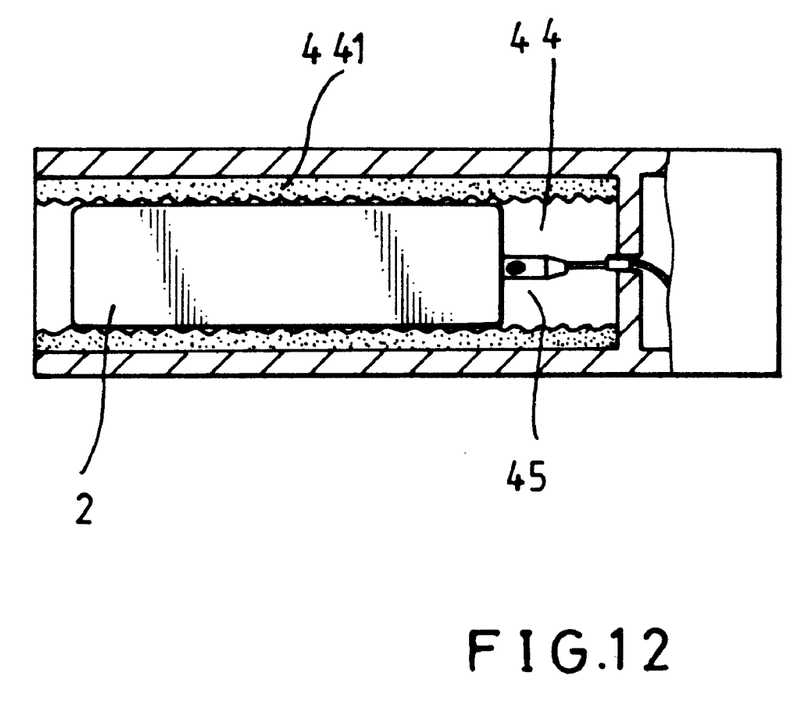
FIG. 12 is a cross-sectional view of a fourth embodiment of the automobile acoustics unit of the present invention shown in use with a cellular phone.

FIG. 12 illustrates another embodiment of the present invention in which a sufficient quantity of a soft layer of protective material 441 is provided along the interior walls of the chamber 44 to stabilize and protect the cellular phone 2 inside the chamber 44. Any soft material can be provided for the layer 441, including but not limited to foam, rubber, sponge and leather. The layer of protective material 441 further enhances the safety and stability of the cellular phone 2 while it is being deployed inside the automobile acoustic unit 4 of the present invention.

Figure 13:
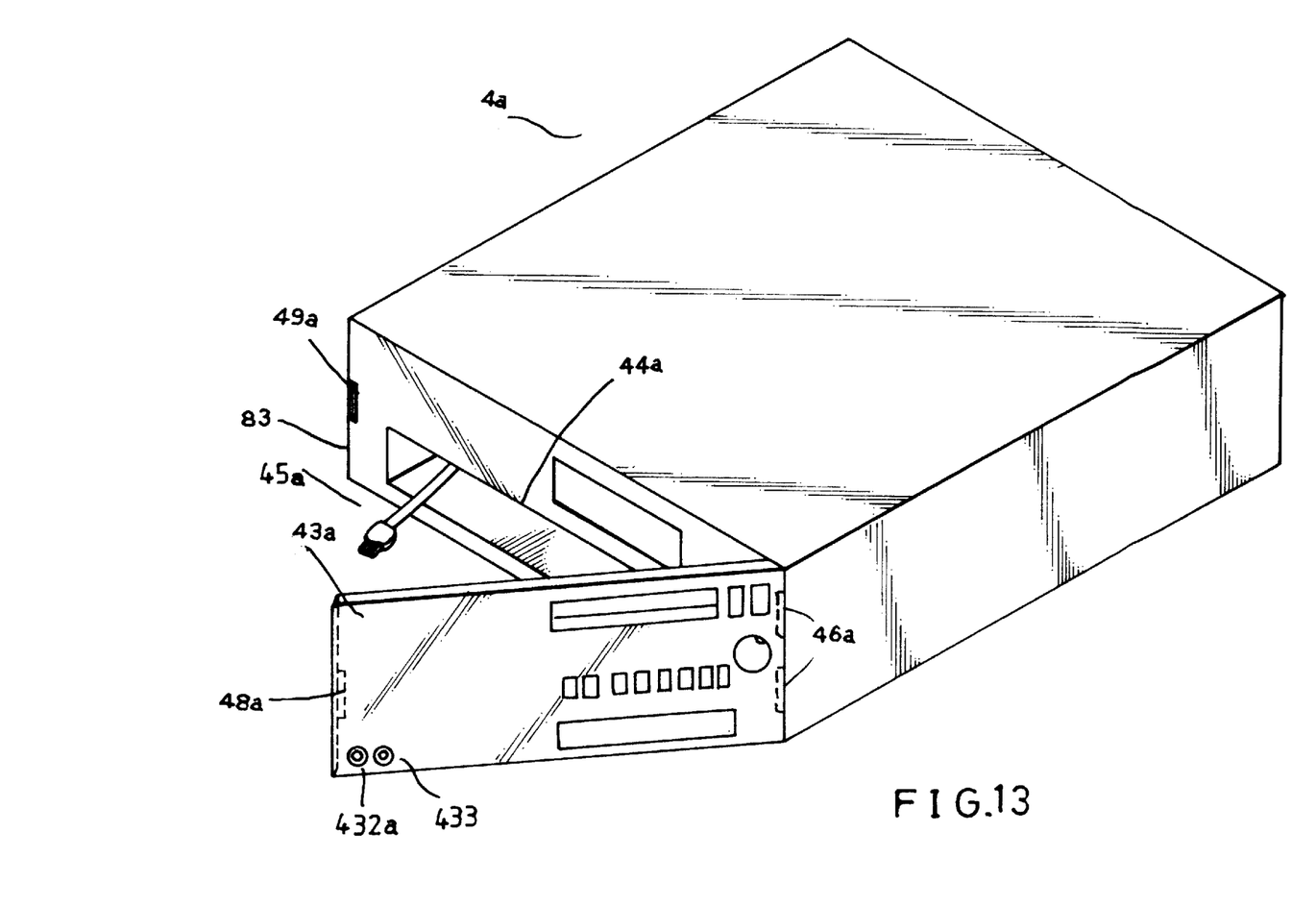
FIG. 13 is an exploded perspective view of a fifth embodiment of the automobile acoustics unit of the present invention.

FIG. 13 illustrates yet another embodiment of the present invention in which the operation or front panel 43a of the automobile acoustic unit 4a is configured to completely cover the automobile acoustic unit 4a, and hence, cover the cellular phone 2 as well. The front panel 43a is pivotably connected to the acoustic unit 4a by a pair of hinges 46a. A fastener 48a is provided on an internal surface of the front panel 43a and is adapted to engage a corresponding fastener 49a provided along a side edge 83 of the automobile acoustic unit 4a. Such fasteners 48a, 49a are therefore concealed from external view, and can be provided in the form of cooperating magnets, male-female connectors, cooperating hooks and latches, Velcro™ and other conventional fasteners. The cellular phone 2 may be connected to the signal terminal 45a inside the chamber 44a, and stored inside the chamber 44a and also concealed from plain view by the front panel 43a. Hence, the front panel 43a provides an acoustic panel having an attractive and integrated appearance, and further conceals the cellular phone 2 to protect it from theft.

The front panel 43a may also provide an earphone jack 432a to allow the user to engage in a private phone conversation if other people are also in the automobile. The front panel 43a may also include a socket 433 that is connected in parallel to the cellular phone signal terminal 45a for on-line communication with a notebook computer via the cellular phone 2.

As a result, the automobile acoustic unit 4 of the present invention significantly reduces the inconveniences of using a conventional cellular phone 2 that is installed inside an automobile, thereby enhancing driving safety. In addition, the automobile acoustic unit 4 of the present invention provides an integrated acoustic unit while eliminating the inconvenience associated with installing a conventional cellular phone 2 on a solid support panel in the automobile. Further, the automobile acoustic unit 4 of the present invention allows the cellular phone 2 to use the audio system of the automobile, thereby improving the sound quality of the telephone conversation. The automobile acoustic unit 4 of the present invention also improves the appearance and comfort of the interior of the automobile by providing a neater appearance that is not cluttered by excess wires.

Although certain components have been described above as including certain elements, it will be appreciated by those skilled in the art that such disclosures are non-limiting, and that different elements, or combinations thereof, can be provided for such components without departing from the spirit and scope of the present invention.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. In combination:
  a cellular phone having a socket; and
  an automobile acoustic unit installed into an interior of an automobile, the automobile acoustic unit having a body that includes a front panel and two side walls that are parallel to each other and perpendicular to the front panel, the front panel having a front opening, the automobile acoustic unit comprising:
  (a) an audio source for generating audio signals;
  (b) a chamber extending from the front opening in the front panel and into the body in a manner parallel to and between the two side walls, the chamber receiving and storing the cellular phone;
  (c) a circuit for controlling and selecting the playback of audio signals from the audio source and signals from the cellular phone; and
  (d) a signal terminal provided inside the chamber for coupling the socket of the cellular phone to the circuit.

2. The combination of claim 1, wherein the automobile acoustic unit further includes a body having a front opening, and a signal terminal provided inside the chamber for coupling the cellular phone to the circuit, wherein the chamber is provided in the body and accessible through the front opening.

3. The combination of claim 1, wherein the circuit includes means for switching between the operations of the audio source and the cellular phone.

4. The combination of claim 3, further including a control panel coupled to the switching means to allow for hands-free control of the cellular phone.

5. The combination of claim 1, further including a hinged cover extending across the front opening.

6. The combination of claim 5, wherein the hinged cover is a front panel having control keys provided thereon.

7. The combination of claim 1, further including a control panel having an earphone jack provided thereon.

8. In combination:
  a cellular phone; and
  an automobile acoustic unit installed into an interior of an automobile, the automobile acoustic unit comprising:
  (a) an audio source for generating audio signals;
  (b) a chamber configured to receive and store the cellular phone, with a signal terminal provided inside the chamber for coupling the cellular phone to the circuit;
  (c) a circuit for controlling and selecting the playback of audio signals from the audio source and signals from the cellular phone; and
  (d) a control panel having a socket for parallel connection to the signal terminal for on-line communication with a notebook computer via the cellular phone.

9. The combination of claim 1, further including a layer of protective material between the chamber and the cellular phone.

10. The combination of claim 1, further including an adapter case configured to be received and stored in the chamber and configured to receive the cellular phone which has a different size or configuration as the size or configuration of the chamber.

11. The combination of claim 1, wherein springs are provided in the chamber to securely retain the cellular phone in the chamber.

12. A method of providing hands-free operation of a cellular phone having a socket, comprising the steps of:
  a. installing an automobile acoustic unit into an interior of an automobile, the automobile acoustic unit having a body that includes a front panel and two side walls that are parallel to each other and perpendicular to the front panel, the front panel having a front opening, the automobile acoustic unit further including a chamber extending from the front opening in the front panel and into the body in a manner parallel to and between the two side walls, the chamber having a signal terminal provided inside, the automobile acoustic unit also including an audio source for generating audio signals;
  b. positioning a cellular phone inside the chamber of the automobile acoustic unit with the socket of the cellular phone coupled to the signal terminal;
  c. providing the automobile acoustic unit with a circuit for controlling and selecting the playback of audio signals from the audio source and signals from the cellular phone; and
  d. coupling the cellular phone to the circuit.

13. The method of claim 12, further including the step of switching between the operations of the audio source and the cellular phone.

14. An automobile acoustic unit installed into an interior of an automobile for use in retaining an audio source, and for controlling the output of audio signals generated by the audio source, the automobile acoustic unit further storing and controlling a cellular phone, the automobile acoustic unit comprising:

a body that includes a front panel and two side walls that are parallel to each other and perpendicular to the front panel, the front panel having a front opening;

a chamber provided in the body and accessible through the front opening, the chamber extending from the front opening in the front panel and into the body in a manner parallel to and between the two side walls, the chamber configured to receive and store a cellular phone;

a circuit for controlling and selecting the playback of audio signals from the audio source and signals from a cellular phone; and     a signal terminal provided inside the chamber for coupling a socket of a cellular phone to the circuit.

15. The device of claim 14, wherein the circuit includes means for switching between the operations of the audio source and a cellular phone.

16. The device of claim 15, further including a hinged cover extending across the front opening.

17. The device of claim 14, further including a control panel having an earphone jack provided thereon.

18. An automobile acoustic unit installed into an interior of an automobile for use in retaining an audio source, and for controlling the output of audio signals generated by the audio source, the automobile acoustic unit further adapted for storing and controlling a cellular phone, the automobile acoustic unit comprising:

a body having a front opening;

a chamber provided in the body and accessible through the front opening, the chamber configured to receive and store a cellular phone;

a circuit for controlling and selecting the playback of audio signals from the audio source and signals from a cellular phone;

a signal terminal provided inside the chamber for coupling a cellular phone to the circuit; and     a control panel having a socket for parallel connection to the signal terminal for on-line communication with a notebook computer via a cellular phone.

19. The device of claim 14, wherein the chamber is provided with a layer of protective material.

20. The device of claim 14, further including an adapter case configured to be received and stored in the chamber and configured to receive a cellular phone which has a different size or configuration as the size or configuration of the chamber.

\* \* \* \* \*